United States Patent [19]
Yoshida

[11] Patent Number: 5,224,065
[45] Date of Patent: Jun. 29, 1993

[54] ARITHMETIC OPERATION UNIT HAVING BIT INVERSION FUNCTION

[75] Inventor: Makoto Yoshida, Tokyo, Japan
[73] Assignee: NEC Corporation, Tokyo, Japan
[21] Appl. No.: 814,719
[22] Filed: Dec. 30, 1991
[30] Foreign Application Priority Data Dec. 29, 1990 [JP] Japan .................................. 2-417201

[51] Int. Cl.$^5$ .............................................. G06F 7/50
[52] U.S. Cl. .................................................. 364/786
[58] Field of Search ............... 364/726, 736, 768, 780, 364/784, 786, 788, 787

[56] References Cited

U.S. PATENT DOCUMENTS

| | | | |
|---|---|---|---|
| 4,831,570 | 5/1989 | Abiko | 364/768 X |
| 4,897,808 | 1/1990 | Nakagawa et al. | 364/784 |
| 4,905,179 | 2/1990 | Licciardi et al. | 364/786 |
| 4,974,188 | 11/1990 | Dolecek | 364/787 X |

Primary Examiner—Jerry Smith
Attorney, Agent, or Firm—Whitham & Marhoefer

[57] ABSTRACT

A bit-inversion arithmetic operation unit comprises a first carry signal line for propagating a carry signal from a more significant bit position side to a less significant bit position side, and a second carry signal line for propagating a carry signal from a less significant bit position side to a more significant bit position side. A common logic circuit performs at least a portion of a carry control including a carry propagation of the first and second carry signals and a carry generation. A switching and logic circuit responds to a required arithmetic operation mode so as to control the common logic circuit and to perform the remaining portion of the carry control including the carry propagation of the first and second carry signals and the carry generation.

3 Claims, 3 Drawing Sheets

ARITHMETIC OPERATION UNIT HAVING BIT INVERSION FUNCTION

BACKGROUND OF THE INVENTION

1. Field of the invention

The present invention relates to a digital arithmetic operation unit, and more specifically to an arithmetic operation unit having a bit inversion function capable of executing a given arithmetic operation in a bit-inverted condition.

2. Description of Related Art

In the prior art, a bit inversion arithmetic operation unit capable of executing a given arithmetic operation in a bit-inverted condition comprises an ordinary arithmetic operation unit so constructed that a carry signal is propagated from the least significant bit side to the most significant bit side, and another arithmetic operation unit so constructed that a carry signal is propagated from the most significant bit side to the least significant bit side. A result of operation of one of the two independent arithmetic operation units is selected on the basis of the kind of a required arithmetic operation.

Since the two independent arithmetic operation units are required, the conventional bit-inversion arithmetic operation unit had required a large amount of hardware.

SUMMARY OF THE INVENTION

Accordingly, it is an object of the present invention to provide a bit-inversion arithmetic operation unit which has overcome the above mentioned defect of the conventional one and which can be constituted of a reduced amount of hardware.

The above and other objects of the present invention are achieved in accordance with the present invention by a bit-inversion arithmetic operation unit comprising a first carry signal line for propagating a carry signal from a more significant bit position side to a less significant bit position side; a second carry signal line for propagating a carry signal from a less significant bit position side to a more significant bit position side; a common logic circuit for performing at least a portion of a carry control including a carry propagation of the first and second carry signals and a carry generation; and a switching and logic circuit responding to a required arithmetic operation mode for controlling the common logic circuit and for performing the remaining portion of the carry control including the carry propagation of the first and second carry signals and the carry generation.

With the above mentioned arrangement, a portion or all of the carry control including the carry propagation of the first and second carry signals and the carry generation is processed by the common logic circuit, the bit-inversion arithmetic operation unit in accordance with the present invention can be constituted of a reduced amount of hardware.

The above and other objects, features and advantages of the present invention will be apparent from the following description of preferred embodiments of the invention with reference to the accompanying drawings.

DESCRIPTION OF THE PREFERRED EMBODIMENTS

Figure 1:
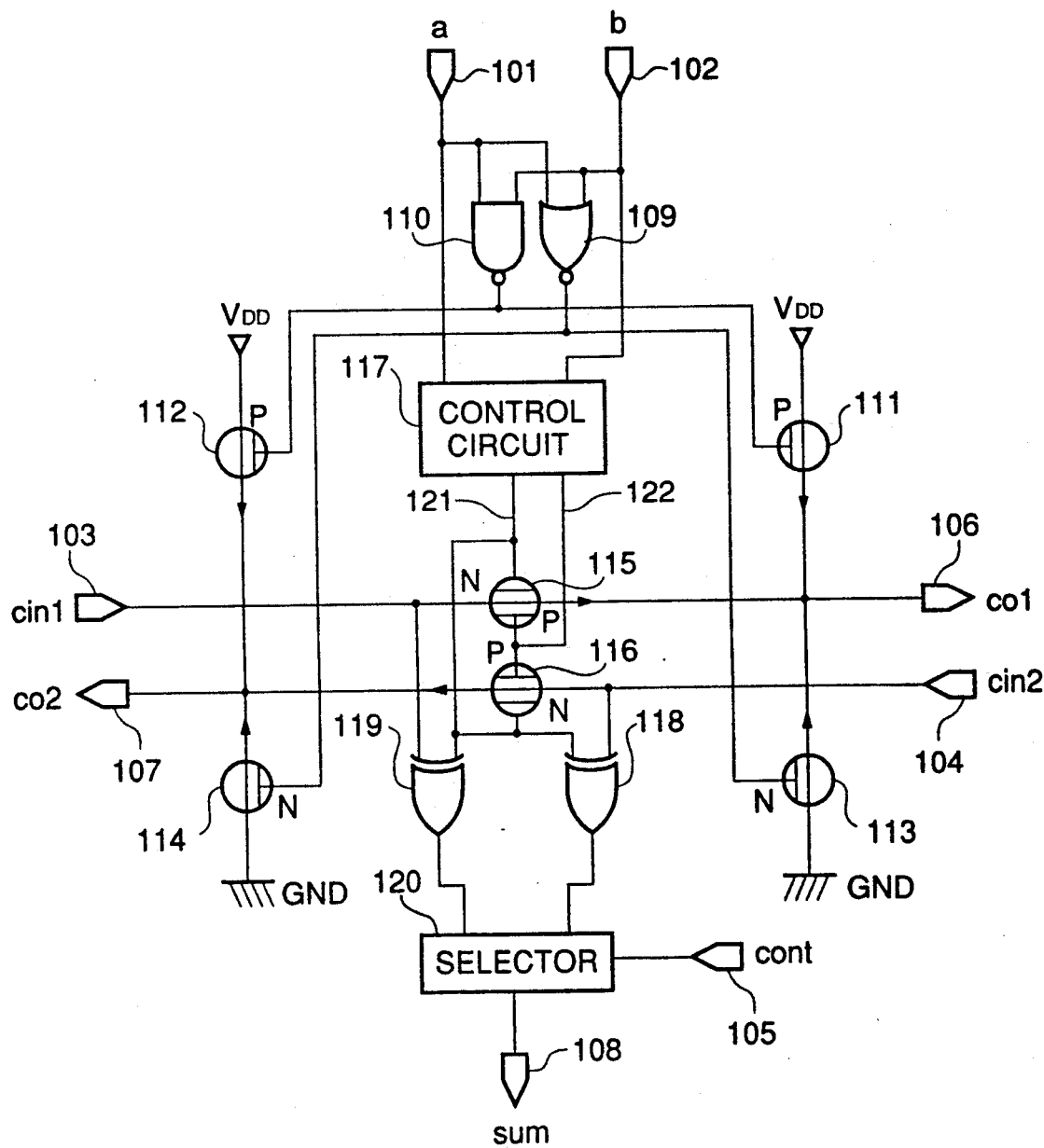
FIG. 1 is a logic diagram of a one-bit arithmetic operation unit of a first embodiment of the bit-inversion arithmetic operation unit in accordance with the present invention.

Referring to FIG. 1, there is shown a logic diagram of a one-bit arithmetic operation unit of a first embodiment of the bit-inversion arithmetic operation unit in accordance with the present invention.

As shown in FIG. 1, a pair of input terminals 101 and 102 are connected to each of a NOR gate 109 and a NAND gate 110. A first carry input terminal 103 is connected through a transfer gate 115 to a first carry output terminal 106, and a second carry input terminal 104 is connected through a transfer gate 116 to a second carry output terminal 107. The first carry output terminal 106 is pulled up through a P-channel MOS transistor 111 to a high voltage $V_{DD}$ and also pulled down through an N-channel MOS transistor 113 to a ground GND, and the second carry output terminal 107 is pulled up through a P-channel MOS transistor 112 to the high voltage $V_{DD}$ and also pulled down through an N-channel MOS transistor 114 to the ground GND. Each of the two pull-up transistors 111 and 112 has a gate connected to an output of the NAND gate 110, and each of the two pull-down transistors 113 and 114 has a gate connected to an output of the NOR gate 109.

In addition, the pair of input terminals 101 and 102 are connected to a carry propagation control circuit 117, which generates a first carry propagation control signal 121 and a second carry propagation control signal 122. The first carry propagation control signal 121 is connected to a gate of an N-channel MOS transistor of each of the transfer gates 115 and 116 and also to one input of each of a pair of exclusive-OR gates 118 and 119. The second carry propagation control signal 122 is connected to a gate of a P-channel MOS transistor of each of the transfer gates 115 and 116. The other input of the exclusive-OR gate 119 is connected to the first carry input terminal 103, and the other input of the exclusive-OR gate 118 is connected to the second carry input terminal 104.

Outputs of the exclusive-OR gates 118 and 119 are connected to a selector 120, which has a selection control input connected to a control terminal 105 and an output connected to an output terminal 108.

If a pair of input signals "a" and "b" are supplied to the input terminals 101 and 102, respectively, the carry propagation control circuit 117 generates the carry propagation control signals 121 and 122, and at the same time, a logical sum and a logical product of the input signals "a" and "b" are generated by the logic gates 109 and 110.

In the case of a bit-inversion arithmetic operation mode, in order to generate a first carry output signal $C_{ol}$ on the terminal 106, when a carry is generated, the first carry output signal $C_{ol}$ is driven to a logic level "1" by the P-channel MOS transistor 111, and when the carry is not generated, the first carry output signal $C_{ol}$ is driven to a logic level "0" by the N-channel MOS transistor 113. When the case corresponds to neither of these two situations, the transfer gate 115 is opened by the first and second carry propagation control signals 121 and 122 so as to cause a first carry input signal $C_{in1}$ to be propagated to the terminal 106, so that the logic level of the first carry output signal $C_{o1}$ is determined by the first carry input signal $C_{in1}$ inputted to the terminal 103.

On the other hand, the exclusive-OR gate 119 generates an exclusive-OR of the first carry input signal $C_{in1}$ and the first carry propagation control signal 121, so that the generated exclusive-OR signal is supplied to the selector 120.

In the case of a normal arithmetic operation mode, in order to generate a second carry output signal $C_{o2}$ on the terminal 107, when a carry is generated, the second carry output signal $C_{o2}$ is driven to a logic level "1" by the P-channel MOS transistor 112, and when the carry is not generated, the second carry output signal $C_{o2}$ is driven to a logic level "0" by the N-channel MOS transistor 114. When the case corresponds to neither of these two situations, the transfer gate 116 is opened by the first and second carry propagation control signals 121 and 122 so as to cause a second carry input signal $C_{in2}$ to be propagated to the terminal 107, so that the logic level of the second carry output signal $C_{o2}$ is determined by the second carry input signal $C_{in2}$ inputted to the terminal 104.

On the other hand, the exclusive-OR gate 118 generates an exclusive-OR of the second carry input signal $C_{in2}$ and the first carry propagation control signal 121, so that the generated exclusive-OR signal is supplied to the selector 120.

Thus, either the sum signal of the bit-inversion arithmetic operation or the sum signal of the normal arithmetic operation is selected by the selector 120 in accordance with the selection control signal "cont", and namely, is supplied as an output of the one-bit arithmetic operation unit.

Figure 2:
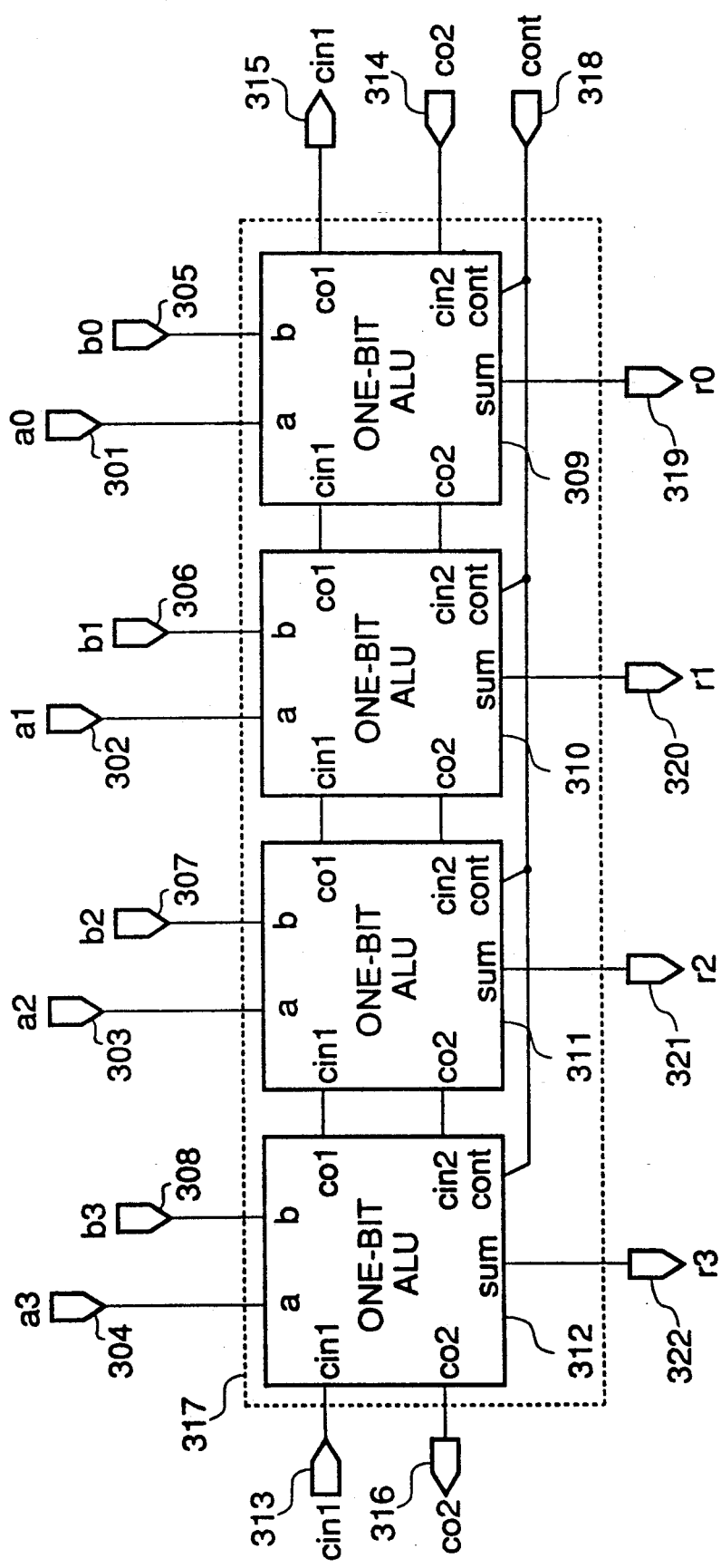
FIG. 2 is a block diagram of a four-bit bit-inversion arithmetic operation unit composed of one-bit arithmetic operation units in accordance with the present invention.

Referring to FIG. 2, there is shown one example of a four-bit bit-inversion arithmetic operation unit composed of one-bit arithmetic operation units shown in FIG. 1.

Two items of four-bit data are composed of bits "a0" to "a3" bits "b0" to "b3", respectively. The input bits "a0" to "a3" are supplied to four input terminals 301 to 304, respectively, and the input bits "b0" to "b3" are supplied to four input terminals 305 to 308, respectively, so that input bit pairs "a0" and "b0", "a1" and "b1", "a2" and "b2", and "a3" and "b3" are supplied to four one-bit arithmetic operation units 309, 310, 311 and 312, respectively.

A first carry input terminal 313 and a second carry output terminal 316 are connected to a first carry input terminal $C_{in1}$ and the second carry output terminal $C_{o2}$ of the one-bit arithmetic operation unit 312, and a second carry input terminal 314 and a first carry output terminal 315 are connected to a second carry input terminal $C_{in2}$ and the first carry output terminal $C_{o1}$ of the one-bit arithmetic operation unit 309. In addition, each pair of adjacent one-bit arithmetic operation units are connected in such a manner that a first carry output terminal $C_{o1}$ and a second carry input terminal $C_{in2}$ of a more significant bit side one-bit arithmetic operation unit are connected to a first carry input terminal $C_{in1}$ and a second carry output terminal $C_{o2}$ of a less significant bit side one-bit arithmetic operation unit, respectively. Furthermore, the four one-bit arithmetic operation units 309, 310, 311 and 312 are connected to receive a common control signal "cont" supplied to a control terminal 318, so that a selected one of a normal arithmetic operation result and a bit-inversion arithmetic operation result is outputted in the form of four output bits "r0" to "r3" to four output terminals 319, 320, 321, and 322.

Figure 3:
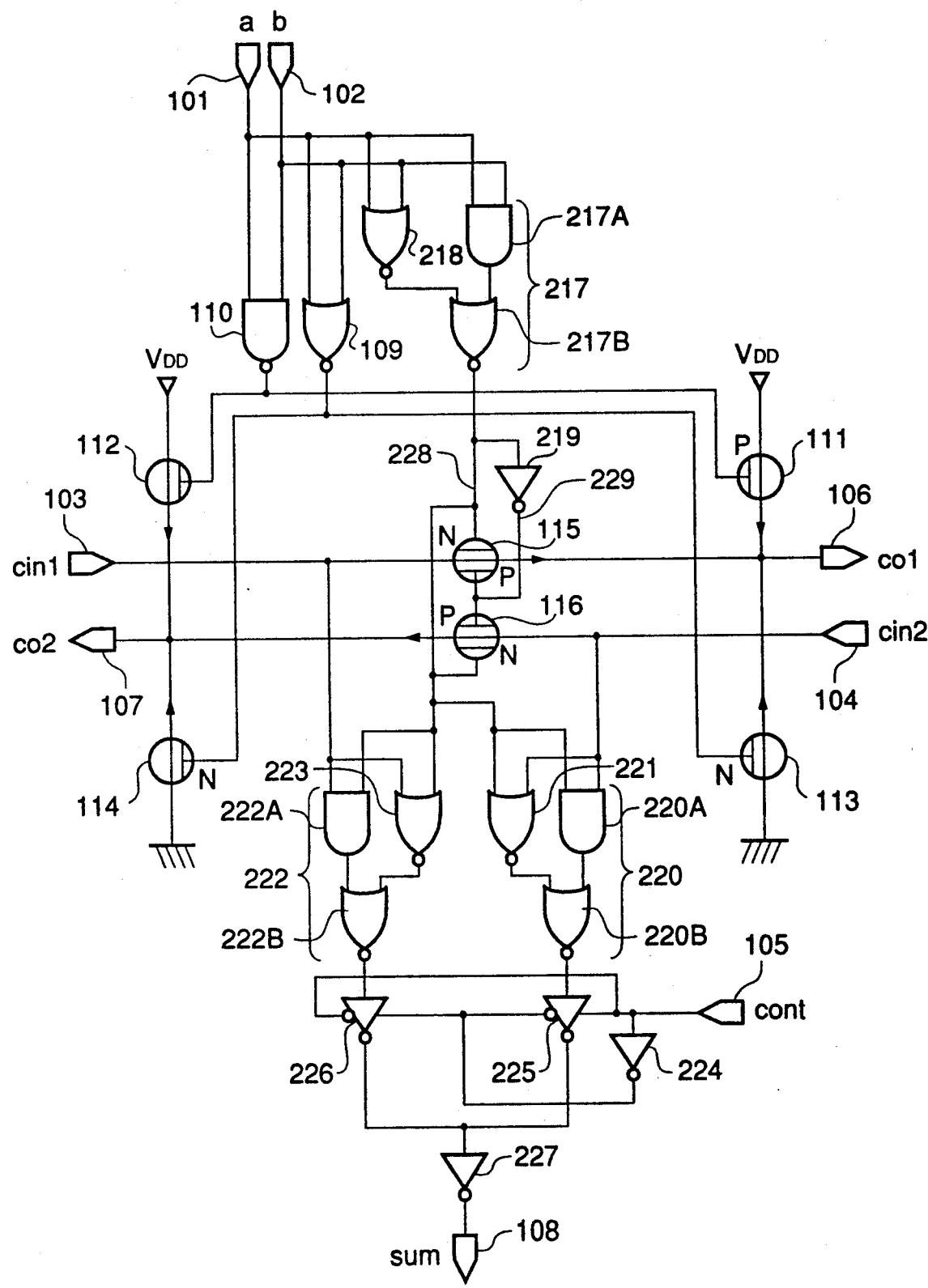
FIG. 3 is a logic diagram of a one-bit arithmetic operation unit of a second embodiment of the bit-inversion arithmetic operation unit in accordance with the present invention.

Referring to FIG. 3, there is shown a logic diagram of an one-bit arithmetic operation unit of a second embodiment of the bit-inversion arithmetic operation unit in accordance with the present invention. In FIG. 3, elements similar to those shown in FIG. 1 are given the same Reference Numerals, and therefore, explanation thereof will be omitted.

As will be apparent from comparison between FIGS. 1 and 3, the carry propagation control circuit 117 is replaced with a NOR gate 218 connected to the pair of input data bit terminals 101 and 102, a "3 and 2" Nor gate 217 connected to an output of the NOR gate 218 and the pair of input data bit terminals 101 and 102 and outputting a carry propagation control signal 228 corresponding to the first carry propagation control signal 121, and an inverter 219 receiving an output of the gate 217 and outputting a carry propagation control signal 229 corresponding to the second carry propagation control signal 122. The "3 and 2" NOR gate 217 can be expressed by an AND gate 217A receiving the pair of input data bit terminals 101 and 102, and a NOR gate 217B receiving an output of the NOR gate 218 and an output of the AND gate 217B.

The exclusive-OR gate 119, which receives the first carry input signal $C_{in1}$ and the first carry propagation control signal 121 and generates an exclusive-OR thereof, is constituted of a NOR gate 223 receiving the first carry input signal $C_{in1}$ and the first carry propagation control signal 228, and a "3 and 2" NOR gate 222 receiving an output of the NOR gate 223 and the first carry input signal $C_{in1}$ and the first carry propagation control signal 228. The "3 and 238 NOR gate 222 can be expressed by an AND gate 222A and a NOR gate 222B connected as shown. On the other hand, the exclusive-OR gate 118, which receives the second carry input signal $C_{in2}$ and the first carry propagation control signal 121 and generates an exclusive-OR thereof, is constituted of a NOR gate 221 receiving the second carry input signal $C_{in2}$ and the first carry propagation control signal 228, and a "3 and 2" NOR gate 220 receiving an output of the NOR gate 221 and the second carry input signal $C_{in2}$ and the first carry propagation control signal 228. The "3 and 2" NOR gate 220 can be expressed by an AND gate 220A and a NOR gate 220B connected as shown.

The selector 120 is composed of a tristate inverter 225 having an input connected to an output of the "3 and 2" NOR gate 220, and another tristate inverter 226 having an input connected to an output of the "3and 2" NOR gate 222, and an inverter having an input connected in common to an output of the tristate inverter 225 and an output of the tristate inverter 226 and having an output connected to the output terminal 108. The selection control terminal 105 is connected directly to a non-inverting control input of the tristate inverter 225 and an inverting control input of the tristate inverter 226. The selection control terminal 105 is also connected through an inverter 224 to an inverting control input of the tristate inverter 225 and a non-inverting control input of the tristate inverter 226.

The second embodiment shown in FIG. 3 operates similarly to the first embodiment shown in FIG. 1, and therefore, the four-bit bit-inversion arithmetic operation unit can be formed using four one-bit arithmetic operation units each of which is the same as that shown in FIG. 3.

The invention has thus been shown and described with reference to the specific embodiments. However, it should be noted that the present invention is in no way limited to the details of the illustrated structures but changes and modifications may be made within the scope of the appended claims.

I claim:

1. A bit-inversion arithmetic operation unit comprising:
    a first carry signal line for propagating a first carry signal from a more significant bit position side to a less significant bit position side;
    said first carry signal line including a first transfer gate connected between a first carry input terminal for receiving a first carry signal from the more significant bit position side and a first carry output terminal for outputting the first carry output signal to the less significant bit position side;
    a second carry signal line for propagating a second carry signal from a less significant bit position side to a more significant bit position side;
    said second carry signal line including a second transfer gate connected between a second carry input terminal for receiving a second carry input signal from the less significant bit position side and a second carry output terminal for outputting the second carry output signal to the more significant bit position side;
    said first and second transfer gates being enabled in the alternative by a switching and logic circuit;
    a common logic circuit for providing, in conjunction with said switching and logic circuit, control of a carry function including a carry propagation of the first and second carry signals and a carry generation;
    said common logic circuit including a NOR gate and a NAND gate each having first and second inputs connected to a pair of data bit input terminals, a first P-channel MOS transistor connected between the first carry output terminal and a high voltage, a first N-channel MOS transistor connected between the first carry output terminal and a ground level, a second P-channel MOS transistor connected between the second carry output terminal and the high voltage, and a second N-channel MOS transistor connected between the second carry output terminal and the ground level, each of the P-channel transistors having a gate connected to an output of the NAND gate, and each of the N-channel transistors having a gate connected to an output of the NOR gate; and
    said switching logic circuit controlling the common logic circuit in response to a required arithmetic operation mode, said switching and logic circuit providing, in conjunction with said common logic circuit, control of the carry function including the carry propagation of the first and second carry signals and the carry generation.

2. A bit-inversion arithmetic operation unit claimed in claim 1 wherein the switching and logic circuit is connected to the pair of data bits input terminals for generating first and second carry propagation control signals complementary to each other.

3. A bit-inversion arithmetic operation unit claimed in claim 2 wherein the switching and logic circuit further includes a first exclusive-OR gate receiving the first carry propagation control signal and the second carry output terminal, and a second exclusive-OR gate receiving the first carry propagation control signal and the first carry output terminal, and a selector connected to an output of each of the first and second exclusive-OR gates and controlled by a node selection signal so as to output a selected one of the outputs of the first and second exclusive-OR gates.

* * * * *